Feb. 19, 1963 T. B. PHILIP 3,077,802
METHOD OF WORKING MATERIALS
Filed Sept. 10, 1954 4 Sheets-Sheet 1

INVENTOR.
T.B.Philip
BY
ATTORNEY

Feb. 19, 1963 T. B. PHILIP 3,077,802
METHOD OF WORKING MATERIALS
Filed Sept. 10, 1954 4 Sheets-Sheet 2

INVENTOR.
T.B.Philip
BY
ATTORNEY

Feb. 19, 1963 T. B. PHILIP 3,077,802
METHOD OF WORKING MATERIALS
Filed Sept. 10, 1954 4 Sheets-Sheet 3
FIG.9
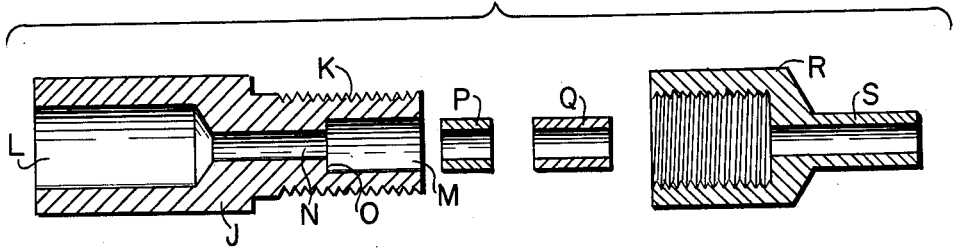
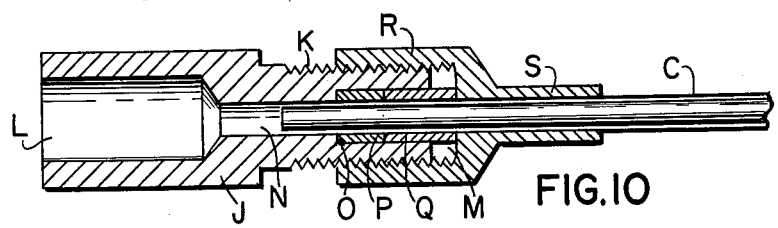
FIG.10
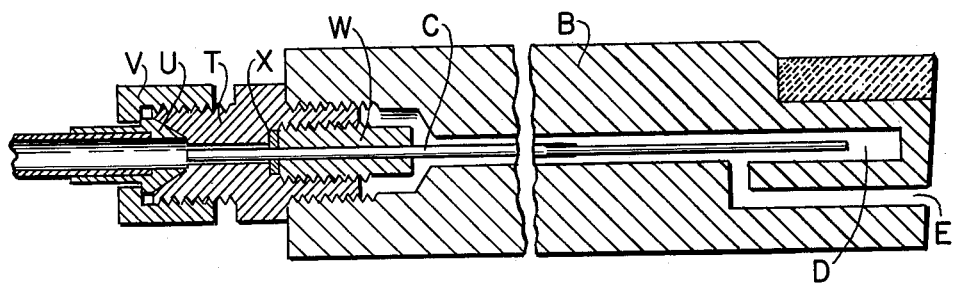
FIG.11
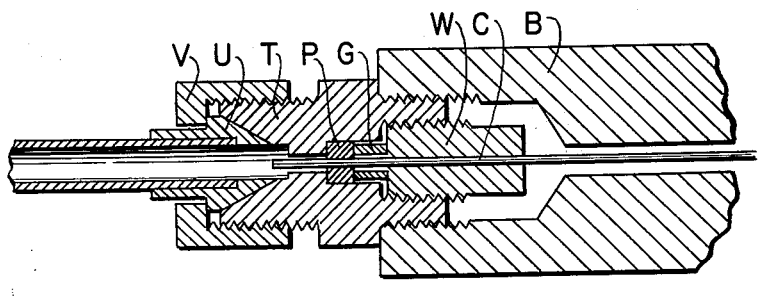
FIG.12
INVENTOR.
T.B. PHILIP
BY
*Albert Jacobs*
ATTORNEY Feb. 19, 1963 T. B. PHILIP 3,077,802
METHOD OF WORKING MATERIALS
Filed Sept. 10, 1954 4 Sheets-Sheet 4

INVENTOR.
T.B.Philip
BY
ATTORNEY 3,077,802
METHOD OF WORKING MATERIALS
Thomas Bruce Philip, Effingham, England, assignor to The Distillers Company Limited, Edinburgh, Scotland, a British company
Filed Sept. 10, 1954, Ser. No. 455,265
Claims priority, application Great Britain Sept. 24, 1953
4 Claims. (Cl. 82—1)

The present invention relates to a method of working metals by means of cutting tools and more particularly to a method of cooling the cutting tool while such operations are being carried out.

The use of carbon dioxide in the form of gas, liquid or snow, or in a combination of these states, for cooling purposes during cutting operations on a lathe has already been proposed and in certain operations it offers considerable advantages over the use of cutting oils even when the latter are refrigerated. In particular, it enables more material to be removed by the cutting tool in a given time and by the cooling action of the carbon dioxide on the tool prolongs tool life. It also enables some materials to be cut satisfactorily which are virtually impossible to cut using other coolants. It furthermore enables surface finishes to be obtained in a turning operation which are normally only obtainable by an additional grinding or honing operation. However, a disadvantage encountered in any method of cooling, whether by the use of carbon dioxide or by conventional cutting oils, is that the removed metal or swarf becomes quenched by the coolant and thereby considerably hardened. Such a state of affairs is highly undesirable and causes erosion of the tool tip. It has now been discovered that these disadvantages may be overcome by allowing the carbon dioxide to expand from a small orifice into a channel within the cutting tool, which channel is arranged so that the gases do not come into contact with the swarf.

According to the present invention, therefore, there is provided a method of working metals by means of cutting tools in which the cooling is carried out by means of carbon dioxide in the form of gas, liquid or snow, or in a combination of these states, characterized in that the liquid or other form of carbon dioxide is led under pressure into the interior of the cutting tool and is allowed to expand in the vicinity of the cutting edge, thereby cooling the latter, and that the gaseous carbon dioxide is then led away from the cutting edge so that the metal removed by the latter is not subjected to the cooling action of the carbon dioxide.

In one embodiment of the invention a blind hole is drilled into the cutting tool extending into the vicinity of the cutting edge, and the carbon dioxide is then led into this hole by means of a capillary tube. The carbon dioxide is allowed to expand near the blind end, the expanded gases then passing back down the hole and finally escaping at a point well away from the cutting edge. In such an arrangement the flow of carbon dioxide is to some extent self-regulating since any blockage of the hole with carbon dioxide snow will reduce the cooling effect thereby allowing the tool to heat slightly which will tend to melt the accumulated snow and restore the flow of carbon dioxide. In order to promote the self-regulating action, fins may be provided on the capillary tube in order to conduct to heat from the tool to the capillary tube.

In another method of carrying out the invention two holes are drilled from different directions into the cutting tool meeting in the vicinity of the cutting edge. In this method the tube for introducing the carbon dioxide may be a close fit in one of the holes since the escaping gas passes down the other hole out into the atmosphere.

It has also been discovered that it is advantageous to lead some or all of the expanded gas through a secondary hole directed at the work piece near the cutting edge without however cooling the metal removed by the cutting edge. This is preferably achieved by means of a secondary hole which meets the main hole, through which the carbon dioxide is introduced, a short distance from the inner end thereof. The capillary tube through which the carbon dioxide is introduced preferably extends slightly beyond the junction of the two holes. By this means a certain amount of solid carbon dioxide can be maintained at the inner end of the main hole while most of the expanded gas escapes through the secondary hole to cool the work piece. If desired, a number of channels may be provided near the cutting tip connected to the main hole in the vicinity of the above-mentioned junction of the main hole and the secondary hole. In this case a portion of the expanded gas is made available for further cooling of the tool tip. In either case a small proportion of the expanded gas may be allowed to escape between the walls of the capillary tube and the walls of the main hole. Alternatively the capillary tube may be sealed into the main hole, for instance by means of a small bush.

In a further embodiment of the invention a subsidiary stream of carbon dioxide independent of the stream cooling the tool is applied to the work piece immediately following the point of cutting, or as close to this point as is convenient, in order to remove from the work the heat generated by cutting before it has time to dissipate over a large area or volume of the work piece. This method of cooling is of particular value in the precision machining of gauges. The subsidiary stream of carbon dioxide may be conveniently fed through a capillary tube located within or alongside the cutting tool. If desired, more than one subsidiary stream of carbon dioxide can be used. The amount of carbon dioxide supplied to the work piece in this manner may be simply regulated by choice of the dimensions of the capillary tube or tubes.

A method of connecting the capillary tube to the carbon dioxide supply line which permits easy replacement or exchange of capillary tubes without the necessity for soldering or brazing each length of capillary tube to a connecting device, comprises compressing a rubber bush surrounding a portion of the capillary mounted within a tubular member so that the rubber bush forms a seal between the capillary tube and the internal walls of the tubular member. The rubber bush may conveniently be a short length of red rubber tubing of such bore that the largest diameter capillary tube which it is desired to use can easily be introduced. The material of which the bush is made, however, can vary considerably, the only requirement being that it should be compressible and elastic to a similar degree to rubber. Various types of synthetic rubbers are quite suitable. The tubular member within which the end of the capillary tube surrounded by the rubber bush is mounted should be of such bore that the rubber bush easily slides therein while slight compression of the rubber bush will increase the diameter of the latter to cause a seal between the tubular member and the capillary. Alternatively, the tubular member may be tapered at this point so that compression of the rubber bush forces it into the narrower portion resulting in a greater compression effect. This compression is most conveniently achieved by means of a cap which can be passed over the capillary tube and screwed on to the tubular member. However the compression required is not very great and a toggle mechanism can be substituted for the screw cap if desired.

It has been discovered that it is advantageous to mount the capillary tube integrally within the cutting tool in such a way that the whole may be disconnected from the carbon dioxide supply line and removed from the machine tool without withdrawing the capillary tube. In this way the capillary tube is not disturbed from its optimum position inside the cutting tool and so does not need readjusting when the tool is again put into use. Moreover, the combined capillary and cutting tool may be reconnected to a carbon dioxide supply line at a grinding wheel when the tool needs regrinding and the carbon dioxide used during the re-grinding operation. The capillary tube may be incorporated in the cutting tool in various ways. For instance, the capillary tube may be soldered or brazed into a hollow plug which screws into the body of the cutting tool or may be secured by means of an arrangement similar to that described in the preceding paragraph.

In a method of practising the invention which does not require the use of a capillary tube or jet, the carbon dioxide is led into the body of the tool and escapes through a foraminous portion of the tool near the cutting edge. The foraminous portion of the tool may conveniently take the form of a sintered metal or other material on which the tool tip is mounted, the tool being drilled in order to lead the carbon dioxide from the supply line into the sintered portion of the tool. Alternatively, a portion in the neighborhood of the cutting edge may be drilled with a plurality of fine holes each leading to the main channel through which the carbon dioxide is supplied. Such an arrangement may be convenient when a tungsten carbide tip is provided to the tool, the steel of the tool body in contact with the tungsten carbide being channelled with a plurality of small ducts. Whatever arrangement is used the carbon dioxide is led along the tool through a larger duct to the foraminous portion and expands there into a plurality of holes escaping from thence into the atmosphere. Any blocking of these channels with solid carbon dioxide affects only a small proportion of the total channels at any one time and does not therefore interrupt the flow of carbon dioxide. Moreover, the transfer of heat from the tool tip to the foraminous portion is maintained at a high level which in itself reduces any blocking of the channels. It is important therefore that if the foraminous portion is formed of a sintered material this should be of high conductivity.

The invention also comprises cutting tools adapted for use according to the foregoing methods of working materials.

The method of cooling according to this invention may be applied equally to cutting tools used in a lathe and to drilling, milling and similar operations.

The invention and the applying of the same in practice are illustrated in several embodiments in the accompanying drawings wherein:

FIG. 9 is an exploded view, in longitudinal section, of a device for holding capillary tubes for use in the invention;

FIG. 10 is a view similar to FIG. 9 but wherein the parts are assembled;

FIG. 11 is a general sectional view through a lathe tool wherein the capillary tube is secured in place;

FIG. 12 is a variation of FIG. 11 illustrating a different mode of securing the capillary tube in position;

Figure 1:
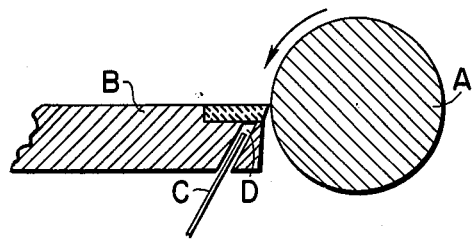
FIG. 1 is a fragmentary sectional view of a lathe tool constructed for use in accordance with the invention, together with an associated work piece.

In FIG. 1 the work A is shown rotating against a tungsten carbide tipped lathe tool B. The hole D is drilled from the underside of the tool extending towards the cutting edge but ending just short thereof. The hole is of substantially larger diameter than the capillary C, which extends thereinto and the dimensions of which are chosen bearing in mind the required flow of $CO_2$ for cooling the tool. The capillary extends nearly to the innermost end of the hole and $CO_2$ expanding after emerging from the capillary is allowed to escape through the hole.

Figure 2:
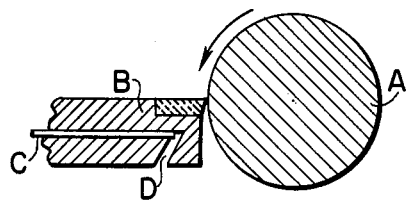
FIG. 2 is a view similar to FIG. 1 of a modified form of tool.
Figure 3:
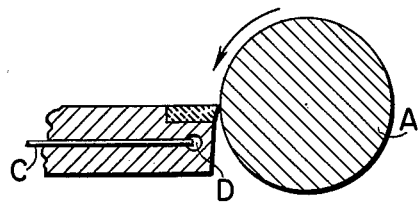
FIG. 3 is a similar view of a further modified form of tool.

FIGS. 2 and 3 represent slightly different arrangements whereby the capillary C is introduced into the tool from one direction and extends to a point in the neighborhood of the cutting edge while the escaping carbon dioxide emerges through the hole D on the underside (FIG. 2) or to one side (FIG. 3) of the tool.

Figure 4:
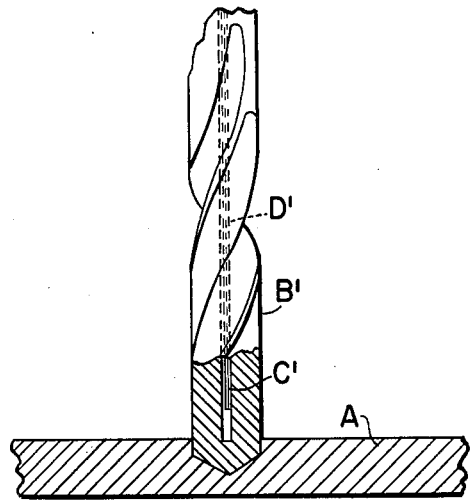
FIG. 4 is a sectional view, partly in elevation, of a twist drill constructed for use in a manner analogous to FIG. 1.

In FIG. 4 the same principle as in FIG. 1 is utilized in connection with a twist drill B' having a hole D' provided with a capillary C'. Owing to the depths of the fluting in most twist drills, however, this arrangement is most practicable with drills of half-inch diameter and larger.

Figure 5:
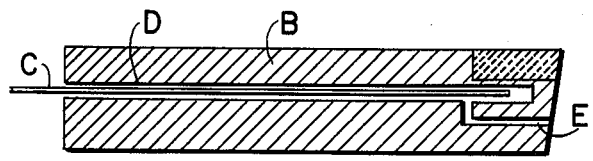
FIG. 5 is a vertical section through another modified form of tool adapted for use in the invention.

In FIG. 5 the main shank of the tool B shown in vertical section carries a tungsten carbide cutting tip. The shank is drilled with a main hole D extending underneath the cutting tip while a discharge hole E is provided to direct the expanded carbon dioxide at the work piece (not shown) at a point slightly underneath the point of contact of the cutting tip with the work. The capillary tube C through which the carbon dioxide is introduced extends slightly beyond the junction of the main hole D and the secondary hole E.

Figure 6:
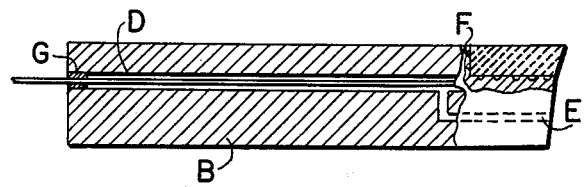
FIG. 6 represents a view similar to FIG. 5 of an additional form of tool construction capable of use according to the invention.

The arrangement of FIG. 6 is generally similar to that shown in FIG. 5 except that a number of small channels F are provided in contact with the tungsten carbide cutting tip of cutting tool B. These channels extend from a point in the vicinity of the junction of the main hole D with the secondary hole E to the surface of the tool. A bush G is also provided so as to form a seal at the point where the capillary tube enters the shank of the tool thus ensuring that all of the expended gas escapes through the holes E and F.

An important advantage shown by the arrangements of FIGS. 5 and 6 is that wastage of carbon dioxide can readily be avoided, since if the amount of carbon dioxide being supplied to the tool is excessive, the expanded gas escaping from the secondary hole contains an undue amount of unvaporized solid carbon dioxide, which is easily visible. A further advantage is that a small reservoir of solid carbon dioxide can be maintained in the interior of the tool which enables fluctuations in the heat generated during the cutting of the work piece to be taken care of without harmful tool-tip temperatures occurring.

Figure 7:
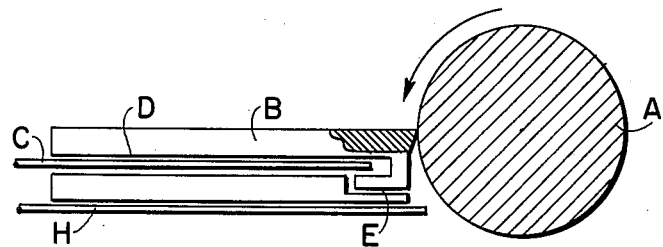
FIG. 7 is a vertical section through a further modified form of tool.
Figure 8:
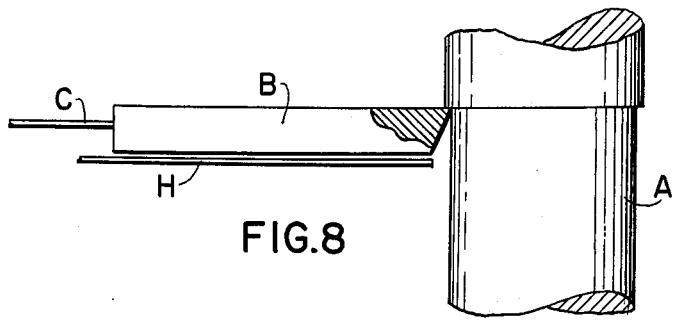
FIG. 8 is a plan view of the tool of FIG. 7.

In FIG. 7 is shown a vertical section and in FIG. 8 a plan view of a further method of cooling according to the invention. The lathe tool B, having a tungsten carbide cutting tip, is shown in position against the work piece A. The tool itself is cooled by means of capillary tube C in hole D and there is a subsidiary outlet E for the expanded gas, as described above. An independent supplementary supply of carbon dioxide solely to cool the work piece is passed through capillary tube H which in FIG. 7 is shown immediately below the tool and in FIG. 8 against the trailing edge of the tool.

FIG. 9 shows in longitudinal section an exploded view of a device for holding capillary tubes, while FIG. 10 shows a similar sectional view of the device when assembled and gripping a capillary tube. These two figures show the cylindrical body of the device J, provided with an externally threaded portion of reduced diameter K. The unthreaded end of the body is bored with a hole L so that the device can conveniently be connected to the $CO_2$ supply line by soldering or brazing. The threaded end is bored with a hole M, a smaller hole N connecting the larger holes L and M. The diameter of the hole M is large enough to provide a substantial shoulder O, at the junction with the connecting hole. The rubber bush P and the metal bush Q fit easily into the hole M and are of such length that when placed in position they protrude beyond the threaded end of the body. The cap portion R is internally threaded so that it can be screwed on to the portion K and is provided with a bored guide portion S of reduced diameter. The connecting hole N, the bushes P and Q and the guide portion S are of sufficient bore to take the largest size of capillary tube with which the device will be used. When assembled as shown in FIG. 10 the rubber bush P is compressed by the action of the screw cap acting on the metal bush Q so that the capillary tube C is securely gripped, while a seal is at the same time formed against the walls of the hole M.

In FIG. 11 the lathe tool B is provided with a tungsten carbide cutting tip and is drilled longitudinally with a blind hole D which has a subsidiary outlet E for the purpose of providing a certain amount of cooling for the work piece. The opposite end of the lathe tool to that carrying the cutting edge is provided with a male connector T to which the carbon dioxide supply line is connected by means of the conical union U and union nut V. A drilled plug W into which is soldered the capillary tube C is screwed into the connector, a gas tight seal being formed by means of the washer X. When the plug W is screwed into the connector T the rubber collet is compressed so forming a gas tight seal between the connector and the capillary tube. In this arrangement the capillary tube is not soldered to the plug W. The general arrangement for FIG. 12 is similar except that the washer X is replaced by a rubber collet P and a metal collet Q.

Figure 13:
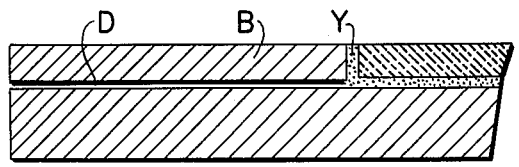
FIG. 13 is a sectional view of a lathe tool wherein the cutting tip is carried by sintered material deposited in a cut away portion at one end of the tool.

In FIG. 13, lathe tool B has a cut away portion at one end on which is deposited the sintered material Y. This in turn carries the tungsten carbide cutting tip, the tool being bored longitudinally with a duct D in order to lead the carbon dioxide from the supply line to the sintered portion.

Figure 14:
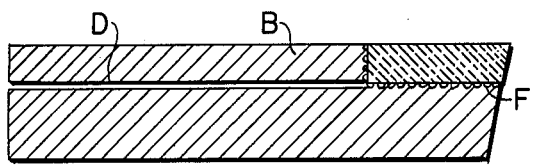
FIG. 14 represents a modification of FIG. 13 wherein the cut away portion of the tool is provided with shallow channels and FIG. 15 is a horizontal section through FIG. 14 showing the arrangement of the channels.

In FIG. 14, the cut away portion of the tool B is provided with a plurality of shallow channels F leading from the main duct D to the outside of the tool. The tungsten carbide tip is mounted directly on the channel portion D and in use is cooled by direct contact of the carbon dioxide.

Figure 15:
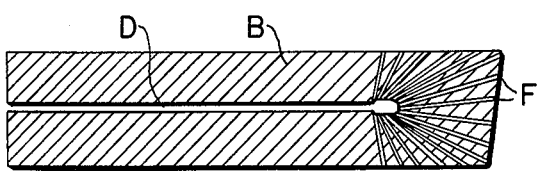

FIG. 15 shows a transverse section of the same tool B through the main duct D and channelled portion F.

I claim:

1. In the method of working metals by means of cutting tools using carbon dioxide as coolant, the improvement which comprises introducing liquid carbon dioxide under pressure into the interior of the cutting tool, allowing the carbon dioxide to expand within the tool in the vicinity of the cutting edge of the tool to form solid and gaseous carbon dioxide, thereby cooling the latter, and leading gaseous carbon dioxide thus formed away from the cutting edge, whereby metal as it is removed by the latter is not substantially cooled by the carbon dioxide.

2. A method according to claim 1, wherein the carbon dioxide introduced into the interior of the tool escapes through a foraminous portion of the tool near the cutting edge.

3. A method according to claim 1 wherein a subsidiary stream of carbon dioxide, independent of the stream cooling the tool, is applied to the work piece near but not at the point of cutting.

4. A method according to claim 1, wherein at least part of the carbon dioxide, after expansion, is conducted out of the tool and directed at the work piece.

References Cited in the file of this patent

UNITED STATES PATENTS

| 178,170 | Lingard | May 30, 1876 |
| 546,044 | Challen | Sept. 10, 1895 |
| 1,214,009 | Coleman | Jan. 30, 1917 |
| 2,629,230 | Turner | Feb. 24, 1953 |
| 2,641,047 | Jackman | June 9, 1953 |
| 2,670,528 | Brunberg | Mar. 2, 1954 |
| 2,713,282 | Brugsmuller | July 19, 1955 |

FOREIGN PATENTS

| 343,753 | Germany | Nov. 13, 1920 |
| 428,554 | Italy | Dec. 22, 1947 |
| 505,234 | France | Oct. 20, 1919 |
| 750,860 | Germany | Jan. 30, 1945 |
| 883,547 | Germany | July 20, 1953 |